Jan. 24, 1956   W. FINKELSTEIN   2,732,047
HANDLE
Filed July 22, 1953

INVENTOR.
William Finkelstein
BY Harry Langsam
Attorney

United States Patent Office 2,732,047
Patented Jan. 24, 1956

2,732,047
HANDLE

William Finkelstein, Philadelphia, Pa.

Application July 22, 1953, Serial No. 369,693

1 Claim. (Cl. 190—57)

My invention relates to improvements in handles and more particularly to handles for traveling bags, suit cases, brief cases and the like.

With my invention I construct the handle in a fashion whereby the two parts of the handle will be folded together with an intervening member wherein there will not be any spaces between the parts.

It is, therefore, an object of my invention to provide a handle made of a single stamping and wherein the parts, when folded one upon the other will not leave an unsightly seam.

Another object of my invention is to devise a handle whose hollow metal form is comprised of a single punch and formed unit.

Another object of my invention is to devise a handle wherein the meeting edges of the single unit handle form are concealed by a moulded or extruded insert; the whole assembly having a neat appearance.

Another object of my invention is to construct an improved device of the character described, that is easily and economically produced, and that is sturdy and compact in construction.

Other objects, novel features and advantages of arrangement, construction and design comprehended by the invention are hereinafter more fully disclosed in the description of a preferred embodiment as illustrated in the accompanying drawings, wherein like reference characters denote corresponding parts throughout.

In the illustrations:

Figure 2:
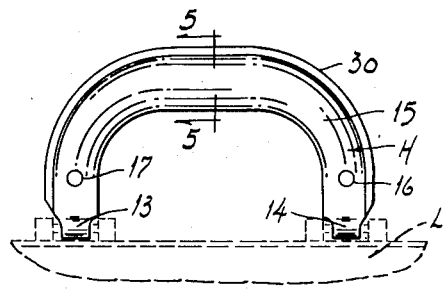
Fig. 2 is a side elevational view of a handle embodying my invention, and having an insert to conceal the joint between the two halves of the handle.

Referring in greater detail to the drawing, I disclose a handle, generally designated as H, whose base form is comprised of a single unit metal stamping, said stamping covered with a cemented-on leather, leather-like material, or fabric covering, and folded to form the handle, the folded halves of the handle secured in space relationship with each other by rivets.

The handle H is comprised of a single metal or plastic stamping 10, each half 11, 12 of the stamping 10 being formed to comprise one half of the handle. Flat connecting members 13 and 14 spaced 180° apart join the halves 11 and 12 and in the finished handle are bent to form loops to receive the connecting means for attaching the handle to the luggage. A flexible covering 15 is cemented to the outer surface of the handle stamping 10 and the edges of said covering are turned over the edges of said stamping 10 and cemented to the inner surface of said stamping.

Figure 3:
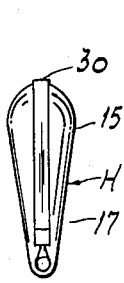
Fig. 3 is an end elevational view of the handle shown in Fig. 2.
Figure 1:
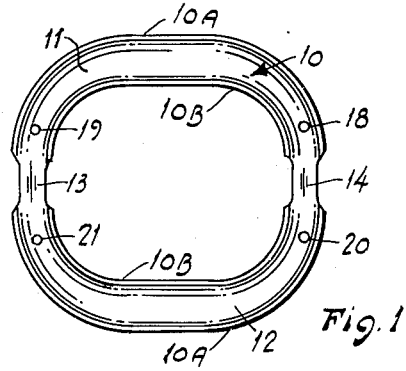
Fig. 1 is a plan view of a single metal shell that comprises two halves of a handle embodying my invention.

After application of the flexible covering, the handle stamping is bent and shaped as illustrated in Fig. 3 and rivets 16 and 17 are inserted through holes 18, 19, 20, and 21, provided in the handle stamping 10 and secured. The rivets 16 and 17 secure the two halves of the handle so that the edges of the handle stamping, covered by the flexible covering, are urged toward each other.

Under certain circumstances, it is desirable to conceal the crack along the outermost edges 10A of the handle where the two halves of the handle abut after assembly. This concealment is accomplished by inserting a preformed insert 30 between the two outer edges 31 and 32 of the handle halves during the assembling operation. The insert 30 conceals the crack and adds a finish to the outer surface of the handle H. The insert 30 extends from the loops defined by the flat connecting portions 13 and 14 along the upper edge of the body 10 and it hides the junction of the two halves of the handle 10, 12. The insert 30, of flexible material, has a rounded top and it has two side slots or recesses 33 and 34. The portion of the flexible fabric 15 which overlaps the upper edges 10A of the segment halves interfits within the slots or recesses 33 and 34, and since the upper edges of the covered blank tightly fit within the slots of the central pre-formed insert the two halves of the handle are held together.

Figure 5:
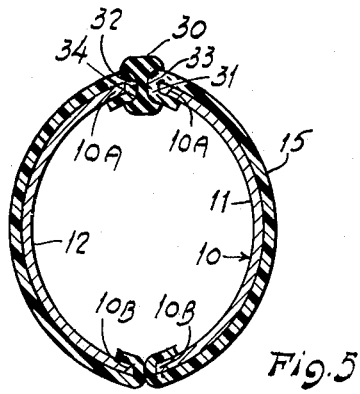
Fig. 5 is a vertical cross-sectional view of the handle shown in Fig. 2, taken along the line 5—5.
Figure 4:
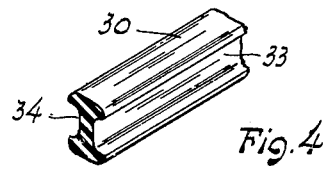
Fig. 4 is an isometric view of the joint concealing member of the handle shown in Fig. 2.

In Fig. 5, the inside edges 10B, 10B of the blank 10 with the covering 15 thereon abut one another, but the outside edges 10A, 10A, are spaced from one another when the handle is folded to provide for the width of the insert 30 between the slots 33 and 34 which fills the space between the edges.

Although my invention has been described in considerable detail, such description is intended as illustrative rather than as limiting, as the invention may be variously embodied, and the scope of the invention is to be determined as claimed.

I claim as my invention:

A U-shaped handle for luggage comprised of a generally circular pressed metal stamping having inner and outer edges, said blank being semi-circular in cross-section in the portion that is engaged by the hand, said blank having portions 180° apart that are flat in cross-section, said blank folded at said flat portions so that said semi-circular cross-section portions fold toward each other with their edges adjacent one another, a pre-formed insert with a groove on each side of the longitudinal length of said insert, the inner edges of said blank abutting one another and the outer edges of said blank interfitting with said grooves in said pre-formed grooved insert to provide a neat finish to the outer edges of said handle and to conceal the opening between the outer edges of said semi-circular portions.

References Cited in the file of this patent

UNITED STATES PATENTS

| | | |
|---|---|---|
| 158,077 | Havell | Dec. 22, 1874 |
| 1,101,273 | Gluckman | June 23, 1914 |
| 2,528,831 | Jaffe | Nov. 7, 1950 |
| 2,563,134 | Romolt | Aug. 7, 1951 |
| 2,672,963 | Epton | Mar. 23, 1954 |